Oct. 16, 1934.                 C. T. PFLUEGER                 1,977,142
                          FISHING REEL CONSTRUCTION
                            Filed March 13, 1934

INVENTOR
CHARLES T. PFLUEGER
BY Ely & Barrow
ATTORNEYS

Patented Oct. 16, 1934

1,977,142

UNITED STATES PATENT OFFICE 1,977,142

FISHING REEL CONSTRUCTION

Charles T. Pflueger, Akron, Ohio, assignor to The Enterprise Manufacturing Company, Akron, Ohio, a corporation of Ohio Application March 13, 1934, Serial No. 715,306

6 Claims. (Cl. 242—84.1)

The present invention relates to fishing reels and particularly to the type of reel structure which is used extensively for casting.

In the operation of reels of this type, the fisherman is called upon in a day's fishing to reel in the line hundreds of times and this is done by holding the reel in the palm of the left hand while the line is drawn in by cranking with the right. With the ordinary reel structure the metal back plate of the reel rests against the palm and it is the object of the invention to ease the pressure on the palm and to afford a firmer grip by mounting a rubber ring in such fashion that it will take the pressure off the hand. The rubber grip ring must be so constructed that it will not easily slip off the back plate and will afford a firm holding means for the reel. The object of the invention is to perfect such a structure, and while the description and drawing are quite detailed, it will be appreciated that changes and modifications are allowable and may be made necessary to adapt the invention to different types of reels.

In the drawing, I have illustrated one form of the invention as adapted to a standard make of reel. In this drawing, Figure 1 is a side elevation of a reel with the improvement mounted thereon;

Figure 1:
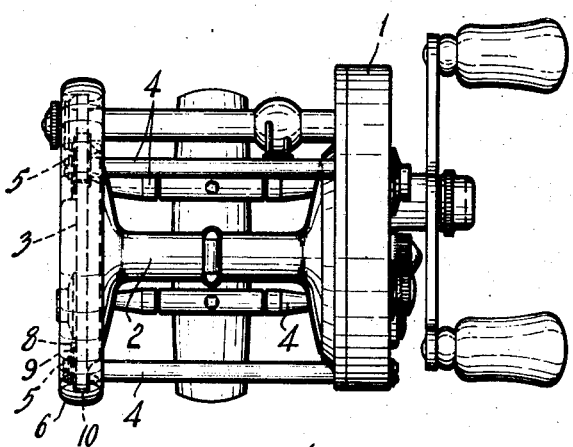

The fishing reel comprises the usual front plate 1 and spool mechanism 2, the back plate 3 and the pillars or posts which constitute the reel structure or cage. These posts are designated by the numeral 4 and are secured to the back plate by screws 5 extending into the pillars.

The rubber ring or cushion is in the form of an annular ring 6 of substantially oval shape in cross-section and having a deep channel 7 on the inner periphery, this channel receiving the edge of the back plate. Ordinarily the channel is approximately half the total depth of the ring.

It will not do, however, to have the ring grip the back plate by friction alone, although the ring may be stretched somewhat in locating it over the back plate so that the tendency of the ring to work over the edges of the back plate is reduced. With the exertion frequently employed in reeling in the line, particularly with a catch, the ring will easily free itself from the back plate. In order to avoid this objection, the ring is reinforced at spaced points with metal washers or plates and means is provided by which the ring will be securely fastened in position. For this purpose the fastening means for the posts are utilized. While the number of posts which are employed for this purpose is shown as three, this number may be reduced or may be increased as found necessary or advisable.

Figure 2:
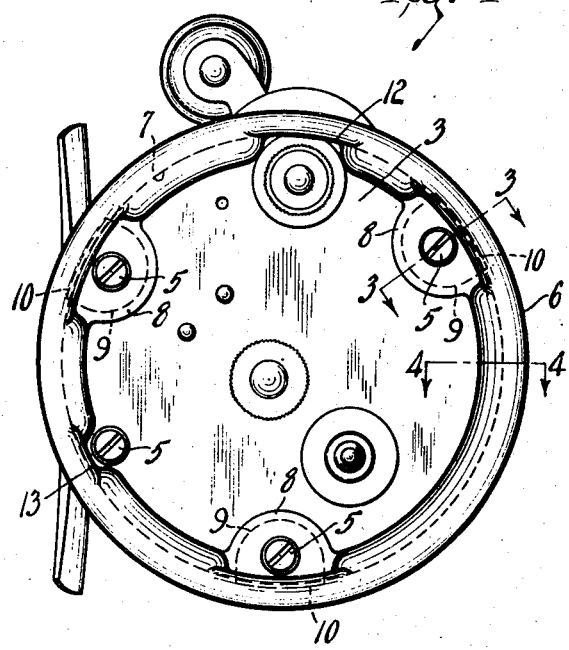
Figure 2 is an enlarged elevation looking at the back plate.
Figure 3:
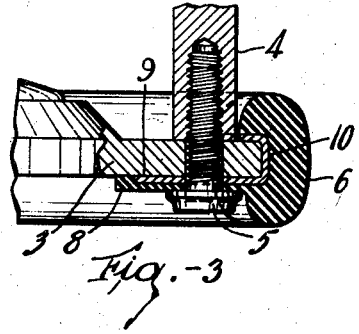
Figure 3 is an enlarged cross-section on the line 3—3 of Figure 2.
Figure 4:
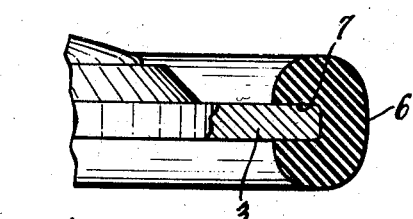
Figure 4 is an enlarged cross-section on the line 4—4 of Figure 2.

As shown in Figure 2, the three points of anchorage are selected about the reel in substantially even spaces so that the anchorage is more secure and for this purpose certain of the posts are selected. At each of three points the ring is formed with flat extending lips 8 formed from the ring and surrounding the screws 5. Embedded in the rubber and vulcanized therein are metal washers 9 of substantially the shape and size of the lips and having U-shaped flanges 10 which embrace the outer perimeter of the back plate. The screws pass through holes in these washers which form a substantial anchorage and prevent the rubber from being squeezed out from under the heads of the screws or from tearing loose at these points. At other points where formations on the back plate appear, the ring of rubber will be cut away as illustrated at the level wind mechanism 12 and the odd post 13.

The designing and proportions of this cushion ring are readily discernible, it being the object of the detailed showing simply to make the invention clear and understandable and not to limit it to exact following of the details.

What is claimed:

1. In combination with a fishing reel having front and back plates and connecting pillars, a ring of cushion rubber surrounding the perimeter of the back plate, and anchorage lips extending from the ring over the pillar locations, the screws from the pillars entering the said lips.

2. In combination with a fishing reel having front and back plates and connecting pillars, a ring of cushion rubber surrounding the perimeter of the back plate and having a channel to receive the edge of the back plate, integral lips extending from said ring over the back plate at pillar locations, flanged washers embedded in the ring and extending around the back plate, and screws passing through the lips and washers and into the pillars.

3. In combination with a fishing reel having front and back plates, a ring of cushion rubber surrounding the back plate and having a channel to receive the edge of the back plate, metal washers embedded in the ring, and securing means passing through the washers into the reel structure.

4. In combination with a fishing reel having front and back plates, a ring of cushion rubber surrounding the back plate and having a channel to receive the edge of the back plate, lips on the ring overlying the back plate, and securing means passing through the lips and into the back plate.

5. In combination with a fishing reel having front and back plates, a ring of cushion rubber surrounding the back plate and having a channel to receive the edge of the back plate, lips on the ring overlying the back plate, washers embedded in the lips, and means passing through the lips and washers into the back plate.

6. In combination with a fishing reel having front and back plates, a ring of cushion rubber surrounding the back plate and having a channel to receive the edge of the back plate, lips on the ring overlying the back plate, washers embedded in the lips, flanges upon the washers embracing the edge of the end plate, and means passing through the lips and washers into the back plate.

CHARLES T. PFLUEGER.